(12) United States Patent
Rose et al.

(10) Patent No.: US 6,503,136 B1
(45) Date of Patent: *Jan. 7, 2003

(54) ALL PURPOSE CLEANER AND POLISH IN ABRASIVE APPLICATOR

(75) Inventors: Edward S. Rose, Leawood, KS (US); Raymond G. Wile, Liberty, MO (US)

(73) Assignee: Dymon, Inc., Olathe, KS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 970 days.

(21) Appl. No.: 08/719,200

(22) Filed: Sep. 24, 1996

(51) Int. Cl.⁷ .................................................. B24D 3/04
(52) U.S. Cl. ........................ 451/533; 451/539; 510/395; 510/439; 510/108; 428/903; 442/340
(58) Field of Search ................... 451/444, 28; 428/903; 442/340, 60; 510/255, 256, 130, 138, 143, 157, 395, 439, 108

(56) References Cited

U.S. PATENT DOCUMENTS

| | | |
|---|---|---|
| 3,277,013 A | 10/1966 | Gianladis |
| 3,619,251 A | 11/1971 | Stiles, Sr. |
| 4,133,921 A | 1/1979 | Palcher |
| 4,336,151 A | 6/1982 | Like et al. |
| 4,364,746 A | 12/1982 | Bitzer et al. |
| 4,448,704 A | 5/1984 | Barby et al. |
| RE31,885 E | 5/1985 | Meitner |
| 4,613,446 A | 9/1986 | Magyar |
| 4,666,621 A | 5/1987 | Clark et al. |
| 4,753,844 A | 6/1988 | Jones et al. |
| 4,775,582 A | 10/1988 | Abba et al. |
| 4,784,786 A | 11/1988 | Smith et al. |
| 4,833,003 A | 5/1989 | Win et al. |
| 4,853,281 A | 8/1989 | Win et al. |
| 4,927,556 A | 5/1990 | Pokorny |
| 4,931,201 A | 6/1990 | Julemont |
| 4,963,432 A | 10/1990 | Fuggini et al. |
| 4,974,763 A | 12/1990 | Widrig |
| 5,094,770 A | 3/1992 | Sheridan et al. |
| 5,234,719 A | 8/1993 | Richter et al. |
| 5,401,326 A * | 3/1995 | Mihelic et al. ............. 510/256 |
| 5,605,749 A * | 2/1997 | Pike et al. ................... 442/60 |
| 5,683,971 A | 11/1997 | Rose et al. |
| 5,698,509 A * | 12/1997 | Nedonchelle ............... 510/256 |

FOREIGN PATENT DOCUMENTS

| | | |
|---|---|---|
| EP | 0068722 | 5/1983 |
| EP | 0256950 | 2/1988 |
| EP | 0573277 | 8/1993 |
| GB | 0842866 | 7/1960 |
| GB | 2179052 | 2/1987 |

OTHER PUBLICATIONS

Atlas, Formulary of Typical Pharmaceutical Formulations for Topical Application Illustrating the Use of Atlas Surfactants and Sorbitol. p. 39–43.

Coleman, D–Limonene As A Degreasing Agent. The Citrus Industry, Nov., 1975. vol. 56, p. 23–25.

Procter & Gamble, Jergens Liquid Soap, Aug. 22, 1986, p. 1.

Lazurosak, Waterless Hand Cleaners and Barrier Creams, Detergents and Specialties, Apr., 1969, p. 26, 28, 73.

Geoghegan, et al., Waterless Hand Cleaners, Soap & Chemical Specialities, Aug., 1969. p. 54–56, 82.

* cited by examiner

Primary Examiner—George Nguyen
(74) Attorney, Agent, or Firm—Shook, Hardy & Bacon L.L.P.

(57) ABSTRACT

A cleaner and polish article comprises a substrate capable of absorbing and retaining a fluid and having two opposed surfaces wherein at least one surface is abrasive, and a nonabrasive aqueous cleaner and polish formulation absorbed, in the substrate. The cleaner and polish formulation comprises an aqueous cleaning emulsion containing water, a surfactant and an organic solvent, a polishing agent, and a carrier, whereby cleansing and polishing action is achieved by the formulation, and abrasive cleansing action and polishing action is achieved by the cleaner and polish formulation as well as by the abrasive surface of the substrate. The substrate is further capable of absorbing the dissolved or softened soil residue to assist in the cleansing action. The substrate can comprise a cloth-like towel. A plurality of such towels is provided in a continuous roll placed in a selectively sealable, essentially airtight container. An opening in the lid of the container allows the user to remove individual towels which contain the appropriate amount of cleanser thereon.

17 Claims, No Drawings

ALL PURPOSE CLEANER AND POLISH IN ABRASIVE APPLICATOR

BACKGROUND OF THE INVENTION

This invention relates to cleaners and polishes, and, more particularly, to a combination all purpose cleaner and polish for rubber, leather, vinyl polymer, acrylic, wood and plastic surfaces.

Polish compositions for rubber, vinyl, leather, acrylic, wood, plastic and the like in the prior art generally consist of a polish formulation which in some circumstances can also be combined with a preservative and renewing agent. In applying these polishes of the prior art, the user typically needed first to select a suitable cleaner composition with which to pre-clean the surfaces to be polished, as well as an application tool for the cleaner, such as a cloth or sprayer. The cleaning step generally entailed use of a cloth or the like which could be the applicator, if any. Once the cleaner was used and the surface sufficiently cleaned, it was then necessary to allow the surface to dry. This was generally accomplished by air drying or by utilizing a dry cloth or towel to remove any moisture remaining on the surface. In order to apply the polish, one needed to utilize an additional application tool, such as a cloth or sprayer, for the application process. In some situations, additional tools, such as a buffing cloth, or the like, were needed to further enhance the appearance of the surface. It is not uncommon for the prior art cleaning and polishing process to utilize up to four different tools for the application, drying and buffing steps.

There is, therefore, a need in the industry to provide a combination cleaner and polish which can be applied to a surface in a single step using a single applicator tool, eliminating the heretofore required multiple steps carried out by applying multiple products to the surface being cleaned and polished using multiple application, drying and polishing tools.

SUMMARY OF THE INVENTION

It is, therefore, an object of this invention, to provide a single formulation for both cleaning and polishing surfaces, wherein the formulation is incorporated onto an abrasive towel substrate, eliminating the need for using multiple formulations and multiple tools, and saving both time and costs associated with such multiple steps and tools.

It is a further object of this invention to provide a single formulation for cleaning and polishing surfaces using a single applicator tool, wherein the formulation and applicator tool are able to cleanse embedded soils, and the residue of the soils is absorbed within the substrate in a single step through a combination of both the cleaner portion of the formulation and the abrasive action of the towel substrate so that additional tools such as sprayers, cloths or the like are not required.

It is also an object of this invention to provide a single formulation for both cleaning and polishing surfaces using a single applicator tool, wherein the formulation, when dried, will not leave an undesirable film on the surface, so that there will be no need subsequent to drying for removal or polishing as with a buffing cloth or a similar device, in order to achieve a desired appearance on the treated surface.

It is another object of this invention to provide a single formulation for both cleaning and polishing surfaces using a single applicator tool, wherein the cleaning and polishing article of this invention further comprises a plurality of saturated towels provided in a continuous rolled cylinder inside a sealed container having a recloseable opening for easily and continuously supplying the towels.

In accordance with these and other objects which will become readily apparent from the description of the invention contained herein, the combination cleaning and polish formulation and abrasive applicator tool of this invention combines in a one step method what, in the prior art, required as many as four steps. Specifically, this invention accomplishes the steps of cleaning, preserving, renewing, and polishing a surface in a single step using a single application/drying/polishing tool.

The surfaces which can be cleaned and polished by the tool of this invention include, but are not limited to, rubber, leather, vinyl polymer, acrylic, wood and plastic surfaces. This tool is particularly useful in the automotive industry in connection with the cleaning and polishing of tires, rubber sealing strips, vinyl tops, dash boards, seats and the like. Due to the nature of the automobile, these surfaces are typically subjected to extreme environmental stresses, including extreme weather conditions, dirt, grease, and the like. As is readily apparent, the tool of this invention is equally useful in connection with the cleaning and polishing of many surfaces in a variety of applications and industries other than those associated with automobiles.

Accordingly, the present invention comprises a combination all-purpose cleaner and polish impregnated in an abrasive substrate, the substrate presenting an abrasive surface and being capable of absorbing and retaining a fluid, and a nonabrasive aqueous cleaner-polish formulation absorbed in the substrate, the cleaner-polish formulation comprising a cleaning emulsion which includes surfactant and a solvent, and a polishing agent, whereby the cleansing action and the polishing action are both achieved by the cleaner-polish formulation and the abrasive surface of the substrate. In addition, the cleansing action is further achieved by the absorption of the dissolved or softened soil residue into the substrate. The article further comprises a plurality of towels provided in a continuous roll housed in a sealed container, and a lid associated with the container and having a recloseable opening for supplying the towels. A key component of the formulation is a cleaning emulsion comprising a surfactant, water, and an organic solvent. A preferred embodiment of the cleaner-polish formulation comprises about 15–40% by weight of the cleaning emulsion, about 20–70% by weight of a polishing agent, and about 10–50% by weight water. In another preferred embodiment, the formulation further comprises about 1–20% by weight of an additional solvent, and 1–10% by weight of a preservative.

DESCRIPTION OF THE PREFERRED EMBODIMENT

A cleaner and polish article is provided and is comprised of an abrasive substrate having a cleaner-polish formulation incorporated thereon. The abrasive substrate of the preferred embodiment comprises a cloth-like towel having at least one abrasive surface. The abrasive surface can be formed in several different manners from a number of different materials. According to one embodiment of this invention, the towel can be similar to that described in U.S. Pat. No. 4,833,003 to Kimberly-Clark entitled "Uniformly Moist Abrasive Wipes," issued May 23, 1989, which is herein incorporated by reference in its entirety. The towel encompassed within the scope of this invention has two opposed surfaces. An abrasive component is permanently attached to or an integral part of at least one surface of the towel, although it is possible for the abrasive component to be present on both surfaces. The abrasive component may comprise a layer of fibers and/or globules bonded to the surface of a substrate, such as a layer of fibers or fiber bundles and small, minute generally spherical masses having a wide range of acceptable diameters, namely from about 40 microns to about 200 microns. Due to the irregular nature of such fibers and globules, it is recognized that the diameter is approximate, as such fibers and globules typically are not perfectly round. These fibers/globules can be formed from polymeric materials by known means, such as by meltblowing a polymer melt. It is not necessary to incorporate a combination of fibers and globules, as it is possible to utilize either component by itself as the abrasive. Alternatively, the abrasive component may comprise any of a number of known particulates which can function as an abrasive when bonded onto a substrate.

The term "abrasive" as used herein refers to a surface texture that enables the towel to produce a mild scouring or abrading action to effectively remove dirt or other contaminates which are embedded in a surface to be cleaned and polished, such as leather or vinyl, while not harming such surface by scratching or the like. The degree of abrasiveness can vary widely, depending primarily upon the abrasive component on the substrate and the degree of texture which is formed by such abrasive component. Typically, the abrasive surface is somewhat coarse and roughened as compared to a smooth surface of the towel. In accordance with a preferred embodiment of this invention, the abrasive is adequately mildly abrasive so as to avoid scratching the surface intended to be cleaned by the towel, while having sufficient abrading qualities to effectively remove embedded dirt and contaminants from the object being cleaned. Although the abrasive properties are very mild, in the sense of not cutting or scouring the object being cleaned, the texture is relatively high so as to accomplish removal of dirt and other contaminants from the object being cleaned.

To be optimally effective, the abrasive component of this invention accounts for a minimum of 10% and a maximum of 90% of the surface area of the abrasive side of the towel, with the opposite side having a smooth surface for wiping and buffing. It is anticipated that both sides of the towel can have abrasive ingredients incorporated thereon and that the percentage of abrasive component on each side can differ as desired.

In addition, the towel must be capable of absorbing and retaining a predetermined amount of fluid, such as the aqueous cleaning and polish formulation contemplated by the preferred embodiment, sufficient to provide a uniformly moist towel. The absorbent character of the towel can be achieved by a system of voids or pores which absorb and tightly retain the cleaner-polish formulation, such as by capillary action. The towel should also be capable of readily releasing the liquid during use. The specific void or pore volume of the towel structure regulates the amount of fluid which can be retained in the towel. The cleaner-polish formulation is incorporated onto the towel and is capable of removing a variety of soils from the surface to be treated. This formulation has a viscosity sufficient to be easily absorbed into the pores or voids of the towel through capillary action.

The composition of a preferred embodiment of the cleaner-polish formulation of this invention comprises, generally, an aqueous cleaning emulsion including a surfactant, water, and an organic solvent, a polishing agent, and a carrier. In another preferred embodiment, additional solvents are incorporated. Optionally, preservatives, biocidal agents and odorants may also be incorporated.

The organic solvent contemplated for use in the formulation of the invention is preferably capable of solubilizing greasy, oily soils, and can include aliphatic solvents, dibasic esters, petroleum oils, vegetable oils, alcohols, glycols, glycol ethers, furfuryls, petroleum distillates and polyols. The aliphatic solvents, such as odorless mineral spirit, are particularly preferred, as they are highly effective in removing petroleum based contaminants and are relatively safe from a toxicity standpoint. The organic solvent should not be harmful to human skin at the concentrations indicated, and cannot be harmful to vinyl, plastic, rubber or leather surfaces. The surfactants employed are preferably nonionic, anionic or amphoteric, and function to promote water/oil single phase emulsions of the ingredients. The polishing agent employed in this invention is preferably a silicone emulsion, although other suitable polishing agents may be employed. The carrier comprises a nonflammable vehicle which also acts as a solvent for water-soluble soils. The inert ingredients contemplated for use with the formulation may include fragrances or odorants, preservatives, and microbial agents.

According to one embodiment, a key cleaning ingredient of the formulation is an aqueous cleaning emulsion. The emulsion is broadly comprised of 2–40% by weight of an organic solvent, 2–20% by weight of a surfactant, and 60–95% by weight water. Optionally, 0–8% by weight of inert ingredients can be included in the composition. In another embodiment, the aqueous cleaning emulsion is comprised of 1–20% by weight d-Limonene, 1–20% by weight of a nonionic surfactant, 1–20% by weight mineral spirits, and 60–95% by weight water. In a preferred embodiment, the aqueous cleaning emulsion is comprised of the following composition, with both the preferred and the acceptable ranges of ingredients being indicated:

| Ingredients | Preferred % By Weight | Acceptable Range of % |
|---|---|---|
| Odorless Mineral Spirits | 4.70 | 1.00–20.00 |
| d-Limonene (terpene) | 9.50 | 1.00–20.00 |
| BHT | 0.05 | 0.01–1.00 |
| Bactericide | 0.05 | 0.01–0.50 |
| Nonionic surfactant | 3.00 | 1.00–10.00 |
| Perfume | 0.05 | 0.01–0.50 |
| Sorbitol | 1.00 | 0.50–5.00 |
| Sodium Lauryl Sulfate | 4.00 | 1.00–10.00 |
| Potassium Sorbate | 0.20 | 0.10–0.50 |
| Preservative | 0.30 | 0.10–0.50 |
| Water | 77.15 | 60.00–95.00 |

This aqueous cleaning emulsion includes both ionic and nonionic ingredients to emulsify and suspend a variety of soils, as well as bactericides and antifungus/mold agents. One example of a nonionic surfactant useful in this invention is Tergitol 15-S-5, manufactured by Union Carbide Corporation.

The following examples of aqueous cleaning emulsions are presented to illustrate this invention, but are not intended to limit this invention in any way.

EXAMPLE 1

General Purpose Formula

| Ingredients | % By Weight |
| --- | --- |
| Odorless Mineral Spirits | 4.70 |
| d-Limonene (terpene) | 9.50 |
| BHT | 0.05 |
| Bactericide | 0.05 |
| Nonionic surfactant | 3.00 |
| Perfume | 0.05 |
| Sorbitol | 1.00 |
| Sodium Lauryl Sulfate | 4.00 |
| Potassium Sorbate | 0.20 |
| Preservative | 0.30 |
| Water | 77.15 |

EXAMPLE 2

Heavy Duty Cleaning Formula

| Ingredients | % By Weight |
| --- | --- |
| Odorless Mineral Spirits | 7.00 |
| d-Limonene (terpene) | 7.00 |
| BHT | 0.01 |
| Bactericide | 0.01 |
| Nonionic surfactant | 10.00 |
| Perfume | 0.01 |
| Sorbitol | 5.00 |
| Sodium Lauryl Sulfate | 10.00 |
| Potassium Sorbate | 0.10 |
| Preservative | 0.10 |
| Water | 60.77 |

EXAMPLE 3

Long-Lasting Quick Touch-Up Formula

| Ingredients | % By Weight |
| --- | --- |
| Aliphatic Solvent | 8.00 |
| Terpene | 1.00 |
| BHT | 1.00 |
| Bactericide | 0.50 |
| Nonionic surfactant | 1.00 |
| Perfume | 0.50 |
| Sorbitol | 0.50 |
| Sodium Lauryl Sulfate | 1.00 |
| Potassium Sorbate | 0.30 |
| Preservative | 0.50 |
| Water | 85.70 |

EXAMPLE 4

Quick Drying Formula

| Ingredients | % By Weight |
| --- | --- |
| Aliphatic Solvent | 1.00 |
| Terpene | 20.00 |
| BHT | 0.20 |
| Bactericide | 0.20 |
| Nonionic surfactant | 2.00 |

Quick Drying Formula -continued

| Ingredients | % By Weight |
| --- | --- |
| Perfume | 0.10 |
| Sorbitol | 2.00 |
| Sodium Lauryl Sulfate | 2.00 |
| Potassium Sorbate | 0.30 |
| Preservative | 0.20 |
| Water | 72.00 |

An example of a preferred cleaner-polish formulation for use in the invention, and which incorporates the above cleaning emulsion, is as follows, with both the preferred and the acceptable ranges of ingredients being indicated:

| INGREDIENT | PREFERRED % BY WEIGHT | ACCEPTABLE RANGE OF % |
| --- | --- | --- |
| 1. Aqueous cleaning emulsion (set forth above) | 20.00 | 15.00–40.00 |
| 2. Solvent | 2.00 | 1.00–10.00 |
| 3. Preservative | 3.00 | 1.00–10.00 |
| 4. Polishing Agent | 40.00 | 20.00–70.00 |
| 5. Odorant | 0.20 | 0.10–1.00 |
| 6. Biocidal agent | 0.02 | 0.005–0.10 |
| 7. Water | 34.78 | 10.00–50.00 |

The aqueous cleaning emulsion, whose composition is described above, contains water, a surfactant and an organic solvent, and is useful in removing dirt and contaminants from the surface to be cleaned so as to enable the polishing agent to effectively polish the surface. The preferred solvents for use in the formulation include glycol ethers and dibasic esters. Particularly preferred is Glycol Ether PM (propylene glycol monomethyl ether) which is an excellent solvent for inks, resins, and paint polymers.

The polishing agent employed in the cleaner-polish formulation of the present invention can be any of a number of known polishes, and is preferably a silicone emulsion such as an emulsion of an organopolysiloxane fluid or fluid mixture in water. Typically, the water works to expand the particular surface being cleaned and polished, such as rubber or polymer, thus assisting in the penetration of the polysiloxane fluid into the treated surface. Such an emulsion is particularly effective when a dimethylpolysiloxane fluid is selected, particularly when the surface to be treated is rubber or vinyl. It is also effective to add to the dimethylpolysiloxane fluid about 10% by weight of an amino-substituted dimethylpolysiloxane fluid to increase the adherence to the surface for longer post application protection. This amino-substituted formulation is especially advantageous when treating metal surfaces. Other modifications, such as the use of phenyl and other substituted dimethylpolysiloxane fluids, may be desirable if the modifications are tailored to the particular material being treated and/or the stresses of the environment to which the material is exposed. Silicone is an effective polish because it is able to penetrate the surface of the treated substance, thus protecting it.

The silicone emulsion useful in accordance with this invention typically comprises water in the amount of from about 65% to about 660% by weight, based on the weight of the silicone fluid. It is possible, however, for the amount of the water to be as high as about 5000% by weight.

Preservatives may also be incorporated into the formulation and can include, but are not limited to, propylene glycol, ethylene glycol, and/or any polyol. In the preferred embodiment of this invention, propylene glycol is used as the preservative. In addition to functioning as a preservative, propylene glycol can also act as a solvent, and can provide temperature stability to the formulation.

The odorant is an optional but desirable component of this formulation. Useful in this invention are a number of suitable known odorants or perfumes. The preferred odorant in the formulation of the present invention is determined, in part, by the particular application desired. For example, when used as a leather cleaner and polish, it may be desirable to add a leather odorant to the formulation.

It is also generally preferred to incorporate a biocidal agent, which acts to prevent bacteria growth in the formulation. Any of a number of biocides can used in accordance with the formulation of this invention. One example of a suitable biocidal agent is Myacide BT.

The carrier comprises a nonflammable material which also acts as a solvent for water-soluble soils. It also acts to interrelate the other substances of the formulation and facilitate their application. In a preferred embodiment, water is the carrier/solvent used in this formulation.

The following examples of cleaner-polish formulations which are distributed throughout an abrasive towel substrate are presented to illustrate this invention, but are not intended to limit this invention in any way.

EXAMPLE 1

General Purpose Formula

| Ingredient | % By Weight |
| --- | --- |
| Aqueous cleaning emulsion (general purpose formula) | 20.00 |
| Glycol Ether PM | 2.00 |
| Propylene Glycol | 3.00 |
| Silicone emulsion | 40.00 |
| Odorant | 0.20 |
| Myacide BT | 0.02 |
| Water | 34.78 |

EXAMPLE 2

Extra Shine Formula With Strong Scent

| Ingredient | % By Weight |
| --- | --- |
| Aqueous cleaning emulsion (quick drying formula) | 15.00 |
| Glycol Ether PM | 2.00 |
| Ethylene Glycol | 3.00 |
| Silicone emulsion | 60.00 |
| Odorant | 1.00 |
| Biocidal agent | 0.02 |
| Water | 18.98 |

EXAMPLE 3

Heavy Duty Cleaning Formula

| Ingredient | % By Weight |
| --- | --- |
| Aqueous cleaning emulsion (heavy duty cleaning formula) | 40.000 |
| Glycol Ether PM | 2.000 |
| Polyol | 3.000 |
| Polishing Agent | 20.000 |
| Odorant | 0.200 |
| Biocidal Agent | 0.005 |
| Water | 34.795 |

EXAMPLE 4

Long-Lasting Quick Touch-up Formula

| Ingredient | % By Weight |
| --- | --- |
| Aqueous, cleaning emulsion (long-lasting quick touch-up formula) | 15.00 |
| Glycol Ether PM | 7.40 |
| Propylene Glycol | 7.40 |
| Silicone emulsion | 20.00 |
| Odorant | 0.10 |
| Biocidal agent | 0.10 |
| Water | 50.00 |

EXAMPLE 5

Quick Drying Formula

| Ingredient | % By Weight |
| --- | --- |
| Aqueous cleaning emulsion (quick drying formula) | 15.00 |
| Glycol Ether PM | 10.00 |
| Propylene Glycol | 10.00 |
| Silicone emulsion | 50.00 |
| Odorant | 0.20 |
| Biocidal Agent | 0.02 |
| Water | 14.78 |

In preparing the cleaner-polish article of a preferred embodiment, a plurality of abrasive towels is provided, preferably in a continuous, perforated, roll. The line of perforation presents a line of weakness by which said towels can be easily separated. Said towels are inserted on-end into a selectively resealable, preferably cylindrical container, with the axis of the cylinder being aligned in an essentially vertical orientation. Of course, it is anticipated that an alternative preferred embodiment of this invention could provide a stack of individual towels instead of the continuous roll of towels. The cleaner-polish formulation is then added to the container, preferably by pouring it over the roll of towels, thereby saturating the towels with the formulation within the container. The capillary action associated with the void volume of the towel, as discussed above, causes the formulation to be distributed evenly throughout the.roll of towels.

An example of a suitable container for holding the towels comprises an essentially airtight lid on the top portion thereof which can be selectively sealed, said lid comprising a hinged cap having an opening positioned thereunder. This opening allows for the passage of towels from the interior of the sealed container via the opening, whereby individual towels can be removed by pulling the towel and tearing the same off of the roll at the perforated line located between each individual towel. The opening is appropriately sized to provide means for removing excess liquid from each individual towel as it is removed from the container.

In use, an individual towel is removed from the container as described above. When properly prepared, the towel contains an amount of the cleaner-polish formulation sufficient to thoroughly accomplish the tasks previously mentioned. As the towel is rubbed onto the surface to be treated, it releases the cleaner-polish formulation for continuous cleansing of soils without the need to apply additional cleaners. The abrasive character of the towel facilitates removal of embedded soils found on the treated surface. In one embodiment, the towel is composed of a non-woven polypropylene that absorbs the softened soils to achieve a clean surface for receiving the polish portion of the formulation.

The cleaner and polish article of the present invention is useful in cleaning, polishing and protecting leather, vinyl, rubber, plastic, acrylic, wood and numerous other surfaces. Some specific applications of this invention include, but are not limited to, automotive uses such as tires, vinyl tops, dash boards, door panels, hoses, belts, vinyl and leather seats, as well as a variety of other diverse applications including luggage, shoes, bumpers, vinyl siding, sports equipment and appliances.

From the foregoing, it will be seen that this invention is one well adapted to attain all the ends and objects hereinabove set forth together with other advantages which are obvious and inherent to the structure. It will be understood that certain features and subcombinations are of utility and may be employed without reference!to other features and subcombinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. A cleaner and polish article, comprising:
    a substrate capable of absorbing and retaining a fluid therein, having two opposed surfaces wherein at least one surface is abrasive; and
    an aqueous cleaner and polish formulation absorbed in the substrate, said formulation comprising a cleaning emulsion including a surfactant, an organic solvent, and a carrier, and a polishing agent;
    whereby cleansing and polishing action are achieved both by said formulation and by the abrasive surface of said substrate.

2. A cleaner and polish article as set forth in claim 1, wherein said substrate comprises a towel.

3. A cleaner and polish article as set forth in claim 2, wherein said towel presents two (2) abrasive surfaces.

4. A cleaner and polish article as set forth in claim 1, wherein said cleaner and polish formulation further comprises:
    a preservative.

5. A cleaner and polish article as set forth in claim 1, where said cleaner and polish formulation further comprises:
    additional solvents.

6. A cleaner and polish article as set forth in claim 1, wherein said cleaner and polish formulation comprises:
    15–40% by weight cleaning emulsion wherein said cleaning emulsion comprises a surfactant, an organic solvent and water;
    1–10% by weight solvent;
    1–10% by weight preservative;
    20–70% by weight polishing agent; and
    10–50% by weight water.

7. A cleaner and polish article as set forth in claim 6, wherein said cleaner and polish formulation comprises:
    20–35% by weight cleaning emulsion;
    3–8% by weight solvent;
    3–8% by weight preservative;
    30–60% by weight polishing agent; and
    20–40% by weight water.

8. A cleaner and polish article as set forth in claim 6, wherein said cleaner and polish formulation further comprises:
    005–0.100% by weight biocidal agent.

9. A cleaner and polish article as defined in claim 1 which is capable of removing soil, wherein
    said aqueous cleaner and polish formulation is capable of softening said soil so as to form a soil residue; and
    said substrate is capable of absorbing said soil residue.

10. The cleaner and polish article as set forth in claim 1, wherein the polishing agent comprises a silicone emulsion.

11. The cleaner and polish article as set forth in claim 10, wherein the silicone emulsion comprises an organopolysiloxane fluid or fluid mixture and water.

12. A cleaner and polish article, comprising:
    a substrate comprising a towel capable of absorbing and retaining a fluid therein, with two opposed surfaces wherein at least one surface is abrasive;
    a nonabrasive, aqueous cleaner and polish formulation absorbed in the towel, said formulation comprising a cleaning emulsion including a surfactant, an organic solvent, and a carrier, and a polishing agent, whereby the cleansing and polishing action are achieved both by said formulation and by the abrasive surface on said towel;
    a plurality of said towels being provided in a continuous roll and forming a cylinder of towels, separated at a line of perforation between each said towel; and
    a selectively sealable, essentially airtight container having a hollow interior in which said cylinder of towels is housed, the axis of said cylinder being aligned in an essentially vertical orientation within said container, and a lid associated therewith, said lid comprising an opening therein for supplying said towels, said opening having a selectively closeable cap associated therewith, whereby an individual said towel incorporating said cleaner and polish formulation can be removed from the interior of said container through said opening, and separated from said roll by tearing along the line of perforation.

13. The cleaner and polish article as set forth in claim 12, wherein the polishing agent comprises a silicone emulsion.

14. The cleaner and polish article as set forth in claim 13, wherein the silicone emulsion comprises an organopolysiloxane fluid or fluid mixture and water.

15. A method for preparing a cleaner and polish article, said method comprising:
    providing a plurality of towels in a continuous roll separated by a line of perforation, said towels presenting two opposed surfaces, and having an abrasive ingredient forming a part of at least one said surface, said towel being capable of absorbing and retaining fluid;

providing a non-abrasive, cleaner and polish formulation incorporated onto said towel, said formulation comprising an emulsion including a surfactant, an organic solvent, and a carrier, and a polishing agent;

providing a selectively sealable container having a hollow interior in which said roll of towels is housed, said container having a lid with an opening therein, and a selectively closeable cap associated therewith;

placing said roll of towels into the interior of said container with the axis of the roll aligned in an essentially vertical orientation;

adding said cleaner and polish formulation to said roll of towels in said container to thereby appropriately moisten said towels with a predetermined amount of said formulation; and sealing said lid on said container to provide an essentially airtight container.

16. The method for preparing a cleaner and polish article as set forth in claim 15, wherein the polishing agent comprises a silicone emulsion.

17. The method for preparing a cleaner and polish article as set forth in claim 16, wherein the silicone emulsion comprises an organopolysiloxane fluid or fluid mixture and water.

* * * * *